United States Patent

[11] 3,629,740

[72] Inventor John F. Merrill
Wappingers Falls, N.Y.
[21] Appl. No. 837,758
[22] Filed June 30, 1969
[45] Patented Dec. 21, 1971
[73] Assignee International Business Machines Corporation
Armonk, N.Y.

[54] TRANSMISSION LINE FILTER CIRCUIT
26 Claims, 25 Drawing Figs.

[52] U.S. Cl. .......... 333/73 C, 333/20, 333/84 M, 307/108
[51] Int. Cl. .......... H03h 7/28, H03h 7/00, H03k 5/00
[50] Field of Search .......... 333/73, 11, 20, 24, 26, 84 M; 307/237, 258

[56] References Cited

UNITED STATES PATENTS

| | | | |
|---|---|---|---|
| 3,345,589 | 10/1967 | Di Piazza | 333/73 |
| 3,409,846 | 11/1968 | Bray | 333/20 |
| 3,503,017 | 3/1970 | Jasper | 333/24 |
| 2,769,101 | 10/1956 | Drosd | 307/108 |
| 3,239,781 | 3/1966 | Podell | 333/11 |
| 3,402,370 | 9/1968 | Ross | 333/20 |
| 3,418,604 | 12/1968 | Ross | 333/20 |
| 3,451,015 | 6/1969 | Heath | 333/73 |
| 2,964,718 | 12/1960 | Packard | 333/73 |

*Primary Examiner*—Herman Karl Saalbach
*Assistant Examiner*—C. Baraff
*Attorneys*—Hanifin and Jancin and Henry Powers

ABSTRACT: A filter circuit stage for pulse shaping having a main shield-grounded transmission line having a characteristic impedance $2Z_o$ and a time length T terminated at both ends with legs of the same $2Z_o$ impedance and same characteristic time length T. The first leg comprises an open-circuited shield-grounded stub of $2Z_o$ impedance, and the other leg comprises a resistor $Z_o$ impedance connected at one end to the main line and at the other end to an open-circuit shield-grounded transmission line stub of $Z_o$ impedance. The filter is only required to be connected to a matching impedance of $Z_o$ at the juncture of the first leg and the main transmission line. The input transition pulse can be applied at either end of the main line and the output pulse produced at its other end is an ultimate composite of two replicas of the input pulse. Each replica is one-half of the input amplitude. One is delayed by the time length T of the stage and the other is delayed by 3 times the time length of the stage.

INVENTOR
JOHN F. MERRILL

BY

ATTORNEY

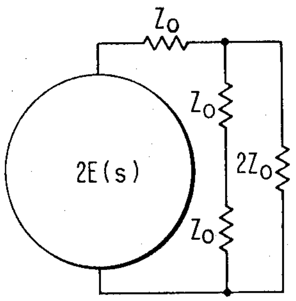

FIG. 3A

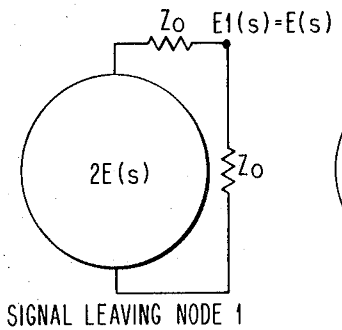

SIGNAL LEAVING NODE 1

LINE A → $\frac{1}{2}E(s)$

LINE B → $E(s)$

FIG. 3B

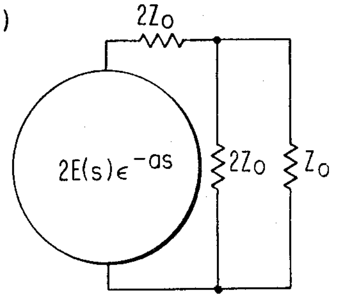

FIG. 3C $$E2(s) = 2E(s)\epsilon^{-as}\left[\frac{\frac{2}{3}Z_0}{2Z_0+\frac{2}{3}Z_0}\right] = \frac{1}{2}E(s)\epsilon^{-as}$$

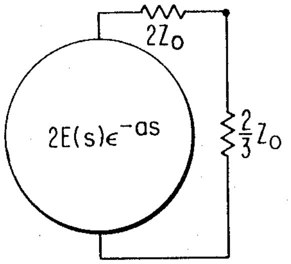

SIGNAL LEAVING NODE 2

LINE B $-\frac{1}{2}E(s)\epsilon^{-as}$

LINE C $+\frac{1}{2}E(s)\epsilon^{-as}$

LOAD $+\frac{1}{2}E(s)\epsilon^{-as}$

FIG. 3D

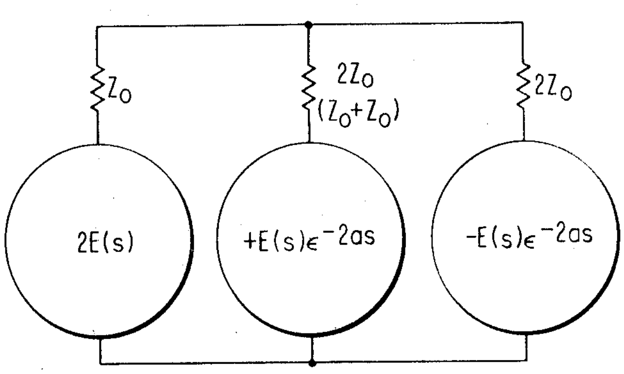

$$E1(s) = E(s) + \frac{1}{4}E(s)\epsilon^{-2as} + (-\frac{1}{4})E(s)\epsilon^{-2as}$$

$E1(s) = E(s)$

SIGNAL LEAVING NODE 1

LINE A 0

LINE B $+\frac{1}{2}E(s)\epsilon^{-as}$

SOURCE 0

FIG. 3E

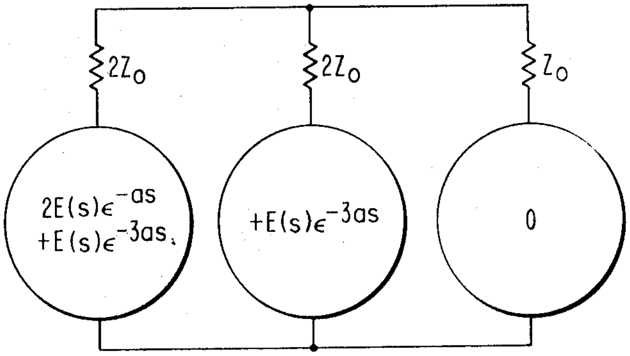

$$E2(s) = \frac{1}{2}E(s)\epsilon^{-as} + \frac{1}{4}E(s)\epsilon^{-3as} + \frac{1}{4}E(s)\epsilon^{-3as}$$

$$E2(s) = E(s)\left[\frac{1}{2}+\frac{1}{2}\epsilon^{-2as}\right]\epsilon^{-as}$$

FIG. 3F

OUTPUT WAVEFORM FROM A 1.STAGE, 2.STAGE, 3.STAGE FILTER WITH STEP INPUT.

OUTPUT WAVEFORM FROM A 1.STAGE, 2.STAGE, & 3. STAGE FILTER WITH STEP INPUT.

INPUT & OUTPUT FROM SINGLE STAGE TRANSMISSION LINE INTEGRATOR $T_r$(out) = 1.68nsec(10-90%)
AMPLITUDE: 3.1V
$T_r$(in) = 0.25 nsec (20-80%)
AMPLITUDE: 3.1V
OUTPUT: 5nsec/cm OUTPUT WAVEFORM FROM TWO nsec STRIPLINE INTEGRATOR
(AMPLITUDE: 3.1V; HORIZONTAL: 5nsec/cm)

$T_r$(in) = 0.25nsec(20-80%)
AMPLITUDE: 3.1V
OUTPUT: 0.5nsec/cm

OUTPUT WAVEFORM FROM TWO nsec STRIPLINE INTEGRATOR
(RISETIME: 1.68 nsec; HORIZONTAL: 500 psec/cm)

TRANSMISSION LINE FILTER CIRCUIT

FIELD OF THE INVENTION

This invention relates to filter circuit, and more particularly to a passive filter circuit for pulse shaping.

DESCRIPTION OF THE PRIOR ART

Testing of various circuits, as for example of a circuits, requires accurate and precise instrumentation, both for measuring the output responses and for applying input stimuli. The input stimuli for functional testing may merely involve switching from one voltage level to another. However, for time measurements (e.g. delay, transition, etc.), the transition between levels becomes increasingly important. In practice, a step function is not always the best stimulus for use in testing integrated circuits because the threshold sensitivity of the circuit under test is lost. Heretofore, it has been the practice to create specific rise times by the use of a step function through commercial rise time filters formed of lumped components or by slowing down the rise time of a ramp function by means of conventional RLC circuits. However such conventional circuits have been characterized by one or more undescribable characteristics, particularly in high-speed application, which include nonlinearity of output ramp compared to that of the input, excessive overshoot and undershoot, excessive delay through the network, variation in response from circuit to circuit, and input impedance variation with frequencies causing reflection in the input line.

An ideal solution would be a passive filter circuit which could reproducibly take a step or a fast ramp input function and remove those frequency components which would change the leading edge of the input function into a desired ramp function without alteration of signal levels. Passive filter circuits, utilizing transmission lines, for shaping pulses having been devised as solutions to the above-indicated disadvantages of prior art pulse generators. Examples of such transmission line filter circuits are disclosed in U.S. Pat. Nos. 3,402,370 and 3,409,846. However, such proposed circuits utilize shorted transmission line stubs which have the inherent disadvantage of field sensitivity in the absence of use within critically controlled environments.

SUMMARY OF THE INVENTION

The present invention comprehends a passive filter circuit adapted for pulse shaping which utilizes terminating stubs or legs of equal time lengths and impedances connected to respective ends of a conductor extending through a shield-grounded transmission main line of same time length T and impedance. The ends of the main line conductor also constitute the access termini of the filter stage for signal flow therethrough. Either access terminus may be employed as an input terminal for an input signal function for shaping in the filter stage with the other access terminus constituting the output of the stage. The time length of the main line and its terminating legs define a like time length T or delay of an input function through the filter stage to the output thereof. It is also essential that the characteristic impedance of the filter stage be twice (e.g. $2Z_o$) that of an external circuit (e.g. $Z_o$) to be matched at an access terminus of the filter stage and it is for all practical purposes unnecessary to match the other access terminus of the filter with external circuits connected thereto. By definition this characteristic impedance $2Z_o$ of the filter stage also represents the required impedance (e.g. $2Z_o$) of the main line and its terminating legs.

One of the terminating legs constitutes a shield-grounded transmission line stub of the characteristic impedance $2Z_o$ having one end of the conductor open-circuited and the other end thereof connected to one end of the main transmission line conductor with the joint therebetween representing the only access terminus required to be matched to an external or adjacent circuit to be connected thereto. In practice, external circuits will normally be matched or otherwise suitably characterized with matching impedances for connection to this access terminus. Also, as indicated above, it is necessary that transmission main line also have a characteristic impedance of $2Z_o$.

The second or other terminating leg, of the main line, comprises a resistor of $Z_o$ impedance (e.g. equal to one-half of the characteristic impedance $2Z_o$ of the filter stage) connected in series with one end of conductor of a shield-grounded transmission line section of the same characteristic impedance $Z_o$ (e.g. equal to one-half of the characteristic impedance $2Z_o$ of the filter stage). It is only necessary that this series-connected resistor and transmission line section have a combined time length T equal to the time length of the main line and the stub connected thereto. The opposite or unconnected end of transmission line section (of this other leg) is open-circuited; and the other or unconnected end of the resistor is connected to the other end of the main line therewith a joint defining a second access terminus characterized by impedance of the impedances of external circuits to be connected thereto. However, the output impedance at this second access terminus will be also characterized with an impedance $Z_o$ which is equal to one-half the characteristic impedance $2Z_o$ of the filter stage.

The invention also comprehends cascading the above filter circuits in various number of stages to provide only desired modification in the rise time of the output ramp. Generally, characteristic time length of each filter stage will be varied which normally may be in multiples of each other with preferred variation extending in a progression $2^{n-1}$ where "$n$" is a positive integer incremented for each additional stage added in the cascaded train regardless the order of disposition of the stage within the train. In this respect, it is immaterial in what order the varied time length stages are cascaded together, and any order of intermixing is permissible. However, it is essential that each of the cascaded stages must have the same characteristic impedance of $2Z_0$, and the access terminus of one stage defined by the connection of the main line with the terminating leg resistor be interconnected with the access terminus of the adjacent stage defined by the connection of the main line with the terminating leg transmission line stub.

It is to be understood that as used herein, the term "transmission line" comprehends coaxial lines, strip transmission lines and any other type of transmission line utilizing a conductor and a shield.

Accordingly, it is an object of this invention to provide a novel filter circuit adapted for the pulse shaping of an input function.

It is another object to provide a novel filter circuit utilizing passive components for pulse shaping of an input function.

A further object of this invention is to provide a novel filter circuit for integration of an input function;

It is also an object of this invention to provide a novel filter circuit having constant and equal input and output impedance independent of input frequencies.

The foregoing and other objects, features and advantages of the invention will be apparent from the following more particular description of the invention, in conjunction with the accompanying drawings.

BRIEF DESCRIPTION OF THE DRAWINGS

FIGS. 3A to 3F represent equivalent Thevenin circuits employed in explanation of the operation of this invention.

DESCRIPTION OF THE PREFERRED EMBODIMENTS

Figure 1:
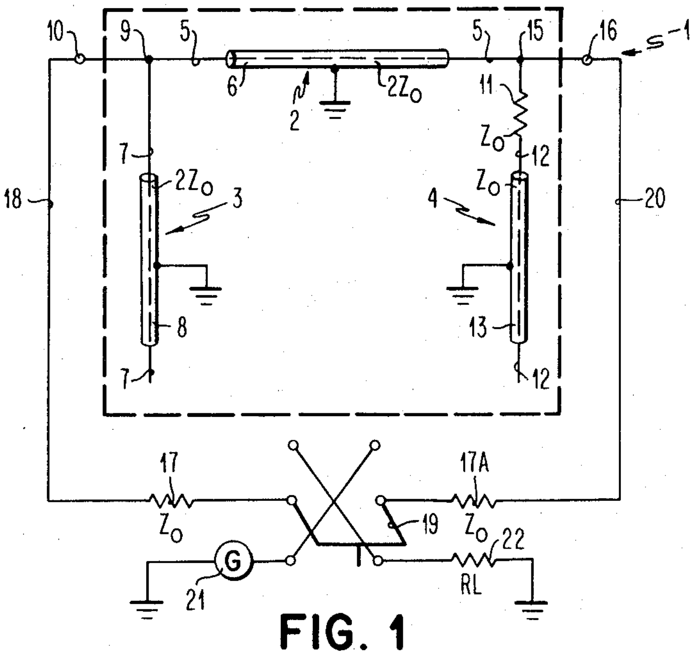
FIG. 1 is a schematic circuit diagram of one embodiment of a filter circuit constructed in accordance with this invention.

Referring to the drawings, a filter circuit in accordance with one embodiment of this invention is shown in FIG. 1 wherein it is indicated generally by the numeral 1. This filter comprises a transmission main line 2 of characteristic impedance $2Z_o$ terminated at both ends with terminating stubs or legs 3 and 4 of like characteristic impedance $2Z_o$ wherein $Z_o$ represents the impedance of an external circuit to be matched to the filter circuit. Also, the main line 2 and each of the terminating legs 3 and 4 necessarily have equal time length T, which in the preferred embodiment will be one-half the rise time of the input function.

As shown, the transmission main line 2 comprises a conventional coaxial cable having a conductor 5 and a grounded shield 6.

The terminal leg 3 is defined by a transmission line stub also comprised of a standard coaxial cable having a conductor 7 and grounded shield 8. One end of stub conductor 7 is connected in common node at 9 with one end of the main line conductor 5 and the other end of conductor 7 is open circuited. The junction 9 between the main and stub lines 5 and 7, respectively, define one access terminus, of the filter circuit 1, which is shown extended externally therefrom to an access terminal 10.

The second terminal leg 4 comprises a resistor 11 of $Z_o$ impedance connected at one end in series of a conduction 12 extending through a shield 13 of a section of a coaxial cable 14 having a like impedance $Z_0$. This series-connected resistor and cable section 11 and 14, respectively, are also necessarily characterized, in accordance with this invention, with a total impedance $2Z_o$ and a total time length T, which are equal to the characteristic impedances $2Z_o$ and time lengths T of the main line 2 and the stub line 3. The free end of resistor 11 is connected in common at 15 to the opposite end of the conductor 5, of main line 2, to define another access terminus of the filter shown extended to a second access terminal 16. For purposes of this description, the required matching impedance $Z_o$ required for matching an external circuit to this terminal 10 is represented by a resistor 17 disposed in line 18 connecting terminal 10 to a reversing switch 19 for directional control of signal flow through the filter circuit. Conversely, the other access terminal 16 is also connected through a matching impedance $Z_o$ (represented by resistor 17A), in line 20, to reversing switch 19. The use of reversing switch 19 is for the purposes of illustrating (as fully set out below) the flexibility of the filter permitting the utilization of either of the access terminus (via terminals 10 and 16) as an input for a transition signal with derivation of identical waveforms at the opposite access terminus.

One of the external circuits, employed in illustration of this invention comprises a pulse generator 21 for generating an input infunction or signals E(*s*) to a selected one of (either stepped or ramped) as represented by terminals access termini 10 and 16 via the reversing switch 19. Similarly, a second external circuit shown comprises a load resistor 22 for similar selective connection to an opposite one of access termini as represented by terminals 10 and 16.

The filter circuit shown in FIG. 1 has the following response to a step input in terms of the La Place transform $$\text{Output } E_o(s)=E_{in}(s)H(s)=\frac{e^{-Ts}+e^{-3Ts}}{2s}$$

where the input $E_{in}(s)=1/s$ and $H(s)=$ Voltage transfer function

Thus, $$H(s)=\frac{E_o(s)}{E_{in}(s)}=\frac{\frac{e^{-Ts}+e^{-3Ts}}{2s}}{1/s}$$

and $$H(s)=\frac{e^{-Ts}+e^{-3Ts}}{2}$$

On application of a unit amplitude pulse with a rise time 2T to an input and normalizing T to 1, the following calculations can be made, where:

$$E_{in}(s)=\frac{1}{2s^2}\frac{-e^{-2s}}{2s^2}$$

$$H(s)=\frac{e^{-s}+e^{-3s}}{2}$$

$$E_o(s)=E_{in}(s)H(s)$$

$$E_o(s)=\left[\frac{e^{-s}+e^{-3s}}{2}\right]\left(\frac{1-e^{-2s}}{2s^2}\right)=\frac{e^{-s}-e^{-5s}}{4s^2}$$

Figure 2A:
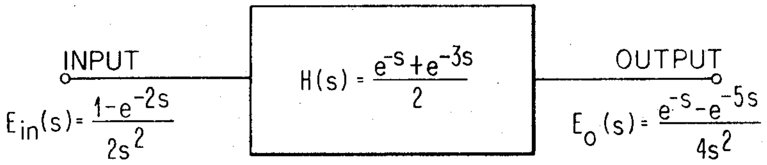
FIGS. 2A to 2C illustrate a black box representation in accordance with a voltage transfer function of a filter circuit of this invention together with representations of the input and output signals thereof.
Figure 2B:
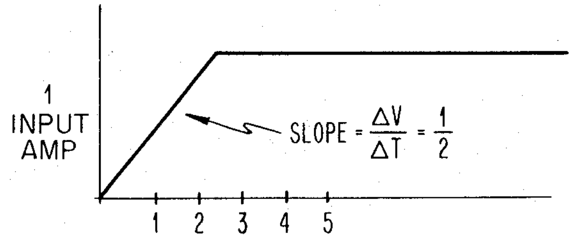
Figure 2C:
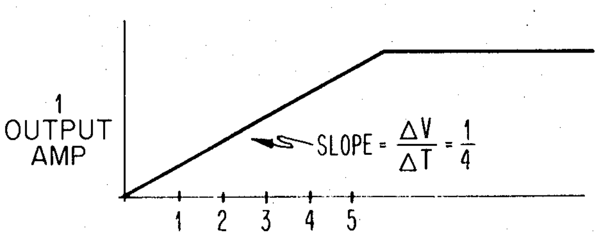

Thus $E_o(s)$ is a unit amplitude with a rise time equal to twice the rise time of $E_{in}(s)$. An equivalent black box circuit of the filter circuit of Figure 1 having a voltage transfer function $$H(s)=\frac{e^{-Ts}+e^{-2Ts}}{2}$$

together with a representation of the signals at the input and output thereof are shown in respective FIGS. 2A to 2C.

Operation of the filter circuit of this invention is also readily apparent by use of time domain analysis wherein a Thevenin equivalent circuit is defined for each instant in time. In accordance with this approach, the Thevenin equivalent voltage on the output of a transmission line is equal to twice the incident voltage at the time the incident voltage arrives at the output of the transmission line. The Thevenin equivalent impedance is the transmission line impedance; and the reflected wave is equal to the output voltage minus the incident voltage. When more than one transmission line is connected to a node, the resultant output voltage at the node can be calculated using the superposition theorem by which the reflected wave of a transmission line is equal to the resultant voltage minus the incident voltage of that line. La Place notation may be used as a means to keep track of when the different incident and reflected waves occur, and to provide a mathematical representation of the circuit which can be interpreted in either the time domain or the frequency domain. Also, once the basic filter circuit is analyzed using La Place notation, the combination or cascading of two or more basic circuits can be analyzed using pure mathematics.

As indicated above either of access terminals 10 and 16 can be employed as an input for a signal with derivation of identical output waveforms. The operation of a first variation utilizing access terminals 16 as an input by closure of reversing switch 19 in the up position connecting generator 21 to access terminal 16, and the connecting load resistor 22 to access terminal 10 through the impedance matching resistor 17. In this respect a timing chart is set out in table A below to facilitate understanding of the operation of this circuit configuration.

TABLE A

| Location | Time (Signal o O | T | 2T | 3T |
|---|---|---|---|---|
| Node 15 | E(*s*) | 0 | 0 | 0 |
| Node 9 | 0 | ½E(*s*) | 0 | ½E(*s*) |
| Cable 14 | ½E(*s*) | ½E(*s*) | 0 | 0 |
| Cable 2 | E(*s*) | −½E(*s*) | ½E(*s*) | 0 |
| Cable 3 | 0 | ½E(*s*) | ½E(*s*) | 0 |

The time at which a step function or signal from generator 21 arrives at node 15 is designated as zero. The equivalent circuit at node 15 at this zero time is shown in FIG. 3A with simplification thereof in FIG. 3B. Since, at this point of time, the circuit input is matched, there is no initial reflection back to the signal source, e.g. generator 21. The incident signal in line 2 is equal to the input signal E(*s*) but the signal in line 14 is attenuated in half, e.g. ½E(*s*) by the leg resistor 11.

The equivalent circuit at time T when the signal arrives at node 9 is shown in FIG. 3C with additional simplification in FIG. 3D where the electrical lengths of terminating legs 2, 3 and 4 are all equal to the term "*a*" employed therein. The first half-step of the signal ½E(*s*), has been delivered to the load RL (e.g. resistor 22), but several other signals have been set up in the network. Two of these signals are racing back toward the input. One of these signals is a negative half-step, e.g. −½E(*s*), reflection from node 9 in cable 2; and the other is a positive half-step, e.g. +½E(*s*), which was totally reflected from the open end of cable 3. FIG. 3E shows the equivalent circuit at node 15 when these two signals arrive at time 2T. Since the resultant voltage at node 15 does not change, two important effects are achieved. First, the input impedance of the network remains the same, and second the leg resistor 11 in series with cable 14 terminating the signal in leg 4. This illustrates the impedance of the network access terminus 15 to impedances of external circuits (e.g. generator 21) connected thereto, thus permitting elimination of the matching impedance resistor **17*a* in line 20** if desired.

At time 2T, there are only two extra signals left in the network. One is the reflection ½E(*s*) leaving node 15, and the other is the reflection ½E(*s*) leaving the open end of cable 3. The equivalent circuit as these signals arrive at node 9 at time 3T is shown in FIG. 3F. Both of these signals are equal, e.g. ½E(*s*) and from a 2$Z_o$ impedance source which is the equivalent of a single $Z_o$ source into a $Z_o$ load. Thus the termination requirements of cables 2 and 3 are also satisfied. Therefore, there are no extra signals within the network. The equation at node 2 is complete and is the transfer function from node 15 to node 9 of the network. It is also the transfer function from node 9 to node 15 if both ports are matched; and as long as node 9 is matched, the input impedance of node 15 will remain constant at $Z_o$.

Figure 4A:
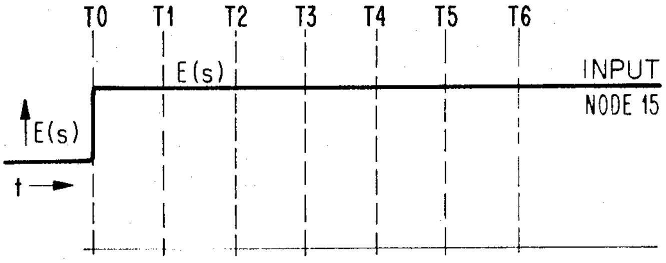
FIGS. 4A and 4B illustrate input and output signal levels in the operation of one embodiment configuration of this invention.
Figure 4B:
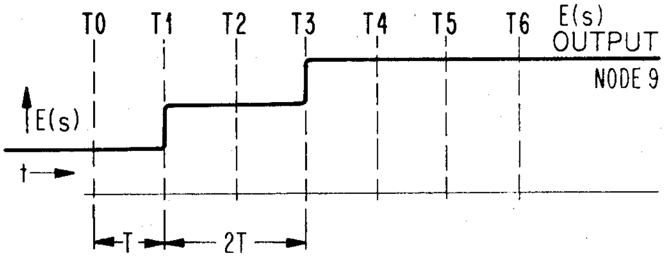

The signal levels at node 15 (e.g. input) at the indicated times are summarized in FIG. 4A; and the signal levels at node 9 (e.g. output) at corresponding times are summarized in FIG. 4B.

To illustrate the operation of the network utilizing access terminal 9 as an input, the following description is given with closure of the reversing switch 19 in the down position. In this configuration generator 21 is connected through a matching impedance resistor 17 to access terminal 9, and the load resistor 22 is connected to access terminal 15 through resistor 17A. For this configuration a timing chart is set out in table B below to facilitate understanding of the signal flow through the network.

TABLE B

| Location | Time (Signal changes) | | | | | | |
|---|---|---|---|---|---|---|---|
| | 0 | T | 2T | 3T | 4T | 5T | 6T |
| Node: | | | | | | | |
| 9 | E(s) | 0 | +¼E(s) | 0 | −½E(s) | 0 | ¼E(s) |
| 15 | 0 | ½E(s) | 0 | ½E(s) | 0 | 0 | 0 |
| Cable: | | | | | | | |
| 3 | E(s) | E(s) | −¾E(s) | −¾E(s) | ¼E(s) | ¼E(s) | 0 |
| 2 | E(s) | −½E(s) | ¾E(s) | −¼E(s) | −¼E(s) | ¼E(s) | 0 |
| 14 | 0 | ¼E(s) | ¼E(s) | ¼E(s) | ¼E(s) | 0 | 0 |

In this configuration the impedance of generator 21 is matched to node 9 via the matching resistor 17. The time at which a step function E(*s*) from generator 21 arrives at node 9 is designated as zero. Thus at time zero, node 9 will rise to E(*s*) and a unit step will be launched in cables 2 and 3 away from node 9. At time T, the wave in cable 3 will be completely reflected in phase toward node 9. At the same time T, the unit step traveling in cable 3 will cause node 15 to rise to ½E(*s*) and it will also launch a voltage step of ¼E(*s*) in cable 14 and a voltage step of −½E(*s*) in cable 2 toward node 9.

At time 2T, the wave traveling in cable 14 will be completely reflected in phase toward node 15. In the meantime, the waves in cables 2 and 3 will arrive at node 9 and increase the voltage by ¼E(*s*). Also at time 2T, a wave of amplitude −¾E(*s*) will be launched in cable 3 away from node 9, and a wave of amplitude ¾E(*s*) will be launched in cable 2 away from node 15.

At time 3T, the wave in cable 3 will be reflected in phase toward node 9 and the waves in cables 2 and 14 will arrive at node 15, resulting in a level change of ½E(*s*) while at the same time a wave of amplitude −¼E(*s*) will be launched in cable 2 toward node 9 and a wave of amplitude ¼E(*s*) will be launched in cable 14 toward its open end.

At time 4T, the waves in cables 2 and 3 will cause node 9 to change by −½E(*s*). Simultaneously a wave of amplitude ¼E(*s*) will be launched in cable 3 away from node 9, and a wave of amplitude −¼E(*s*) will be launched in cable 2 toward node 15. Also, at time 4T, the wave in cable 14 will be reflected in phase toward node 15.

At time 5T, the waves in cable 2 and 14 will arrive at node 15 and will result in no change in level at node 15. Simultaneously a wave of amplitude ¼E(*s*) will be launched in cable 2 toward node 9, and the wave in cable 3 will be reflected in phase toward node 9.

At time 6T, the waves in cables 2 and 3 will be coincident at node 9 raising its potential to its final value of E(*s*), and the entire circuit comes to rest.

Figure 5A:
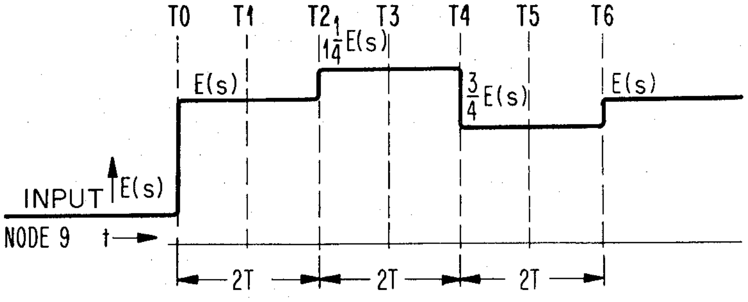
FIGS. 5A and 5B illustrate input and output signal levels in the operation of another embodiment configuration of this invention.
Figure 5B:
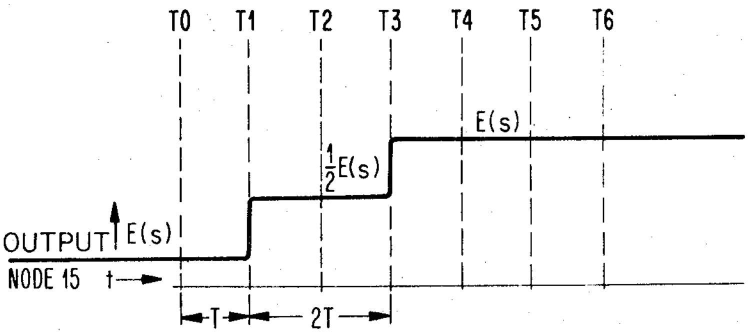

The signal levels at node 9 (e.g. input) at the indicated times are summarized in FIG. 5A; and the signal levels at node 15 (e.g. output are summarized in FIG. 5B.

Since the input impedance of the network has been shown to satisfy the load requirements, these networks can be cascaded, where the resultant transfer function will be the product of all the individual network transfer functions. To generate a staircase waveform, each succeeding network will have line lengths half the length of the proceeding network. In normal use a signal source would be used to feed node 9 and have a source impedance matched to the network so that the load at node 15 is always looking back into a constant impedance $Z_o$. Conversely in this cascaded configuration succeeding networks will have line lengths twice the length of the preceding network. However it is to be noted, that the cascaded filter stages need not necessarily follow in a progressively increasing or decreasing order, since, as will be shown below, they can be intermixed. In general, for most practical purposes each filter stage added in a train thereof will normally have only its line lengths twice the length of another in the general sequence.

Also, stages of like lengths cascaded if desired.

In sum, the single stage filter circuit described above is characterized by the ability to either of access termini as an input with an identical output waveform, and that the output impedance at node 15 is, $Z_o$ for all frequencies. Thus, if access terminies is used as an input, some energy will be reflected toward the generator. This presents no problem if the generator has a $Z_o$ output impedance (i.e. is matched to the system characteristic impedance). However, if the load reflects some energy to access terminus 15, this energy will be absorbed by the filter. Also, the delay through the filter is equal to the electrical length of the filter stage involved.

Figure 6:
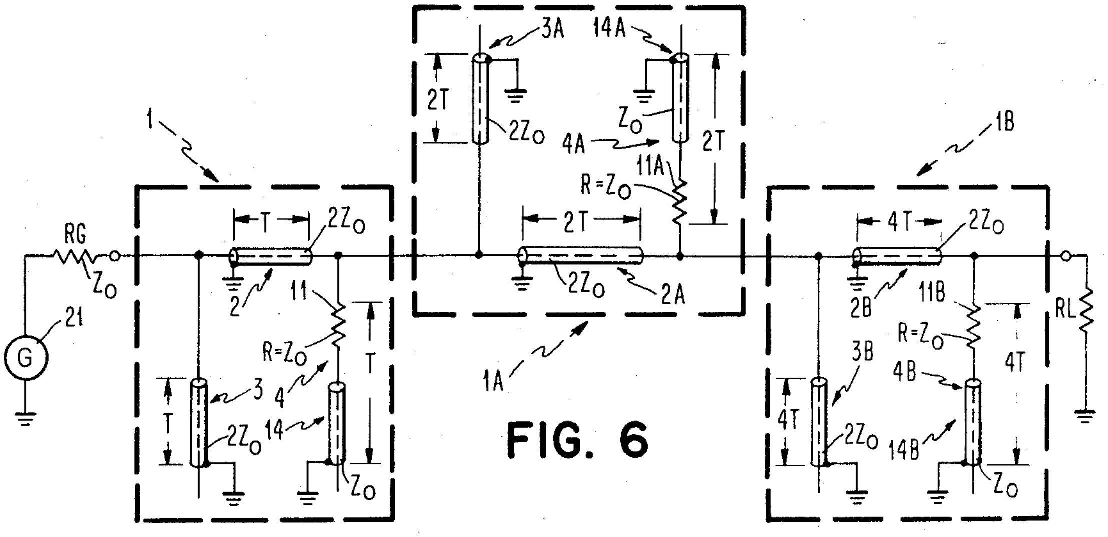
FIG. 6 is a schematic diagram of a pulse shaper utilizing the filter circuits of this invention.

In FIG. 6 is shown a train of filter stages in which a filter stage 1 described above is cascaded with additional filter stages 1A and 1B of identical circuit configurations. The sole distinction between the three stages 1, 1A and 1B residing solely in the time lengths of each and of the corresponding mainlines and terminating legs, where the time length of filter stage 1A is twice the time length of stage 1, and where the time length of stage B is twice the time length of stage 1A. In sum, the time length of each succeeding stage (in FIG. 6) is doubled; and as indicated, the remaining circuit configuration is identical. Thus, the coaxial cables of mainlines 2, 2A, and 2B have an identical impedance of $2Z_0$, the coaxial cable of terminating legs 3, 3A and 3B have identical impedances of $2Z_0$, each of resistors 11, 11A and 11B in respective terminating legs 4, 4A and 4B have an identical impedance of $Z_0$, and each of the coaxial cables 14, 14A and 14B of respective terminating legs 4, 4A and 4B have an identical impedance of $Z_0$.

Figure 7:
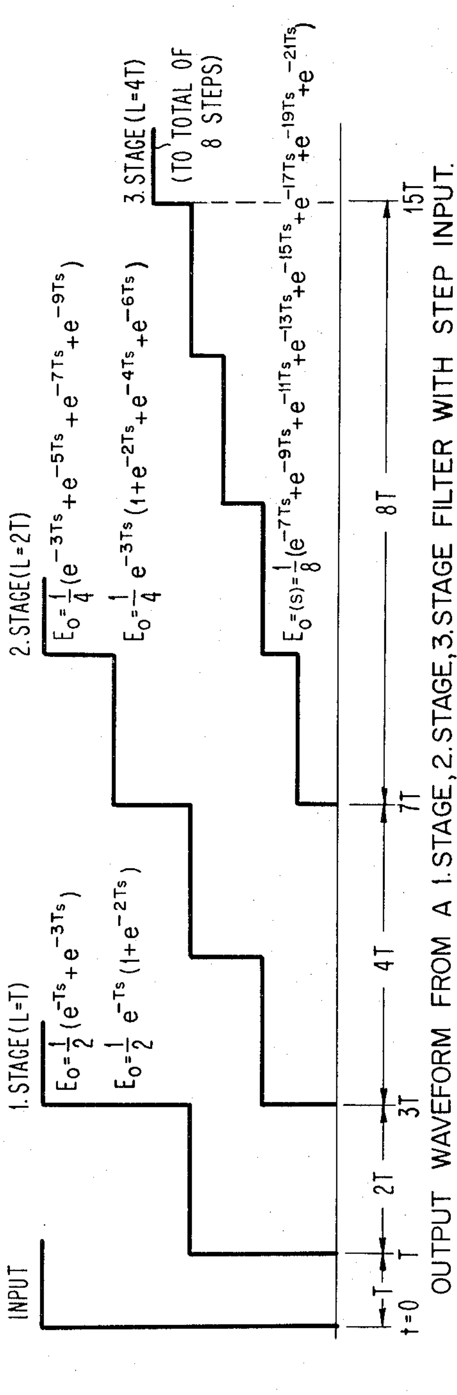
FIGS. 7 and 8 input and output signal levels in the operation of the pulse shaper of FIG. 6.
Figure 8:
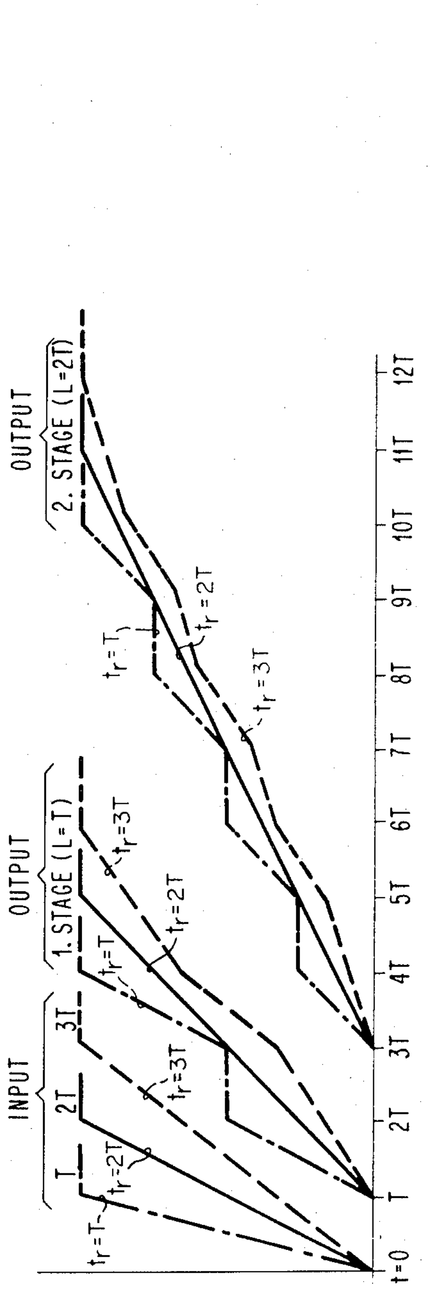

FIG. 7 shows the output waveform of the first, second and third filter stages (e.g. 1, 1A and 1B respectively) produced by a step function input, where the fundamental electrical length of the first stage 1 is T*ns*. As will be noted, as the number of stages is increased, the number of steps in the output is doubled for each of the stages added. Also for each of the successive stages added, the output step amplitude is halved. In general, as can be seen, if the first stage has an electrical length small enough and enough stages are cascaded, a smooth ramp transition can be obtained from a step function input:

FIG. 8 shows the output waveform through the first two stages (e.g. 1 and 1A) produced by a ramp function input. The fundamental electrical length of the first stage is again T*ns*. As will be noted of the three ramp inputs plotted, the optimum ramp input that produces a ramp output is 2T, whereas the T input ramp is too fast and the 3T input is too slow. In general, for optimum results, the input transition should be two times the electrical length of the smallest filter stage, and the electrical length of 3T largest stage should be one-fourth of the desired output transition. In general, the slope of the output waveform is defined by the filter stage and will not change even if the input risetime is not matched to the optimum case of two times the electrical length of the smallest stage.

Although discontinuities can result along the output slope if the input transition is not matched to the filter, these can be minimized by employing as many filter stages as possible, and as discussed below by using wave-shaping techniques on the input waveform to prevent overshoot.

In the practical application of a transmission line filter, it is uncommon to find a perfectly shaped ramp waveform that can be used as the input to the filter. However, if the input signal transition is linear from the 25 to 75 percent points (which is often the case in the real world) then a satisfactory match can be made between the input signal and the integrator design.

The effect of a single transmission line integrator stage on a practical waveform can be readily seen. The transfer function of a single-stage filter in terms of the La Place transform is:

$$\frac{E_o(S)}{E_i(S)}=\frac{1}{2}\left(e^{-TS}+e^{-3TS}\right)$$

Where:

$E_i(S)$ = input signal $E_o(S)$ = output signal

T = electrical length of the filter stage

The output signal is therefore the summation of two terms: both of these terms have the same waveshape as the input signal but with two important differences.

1. Their amplitude is one-half the amplitude of the input signal.
2. Their slope ($dv/dt$) is also one-half the slope of the input signal.

Figure 9:
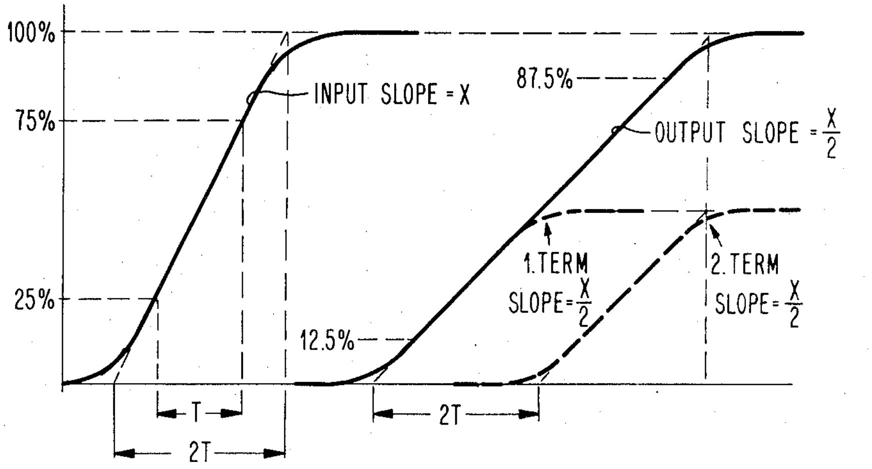
FIG. 9 shows a plot of waveforms employed in analysis of a filter circuit of this invention.

A third result is that these terms are separated in time by exactly 2T (T being the electrical length of the filter stage as shown in FIG. 9).

With these points in mind, a graphical representation can easily be made to show the output waveform. This is shown in FIG. 9. In this figure the input signal transition is linear from the 25 to the 75 percent points and nonlinear outside these limits. If we extend the linear portion of this waveform to the 0 and 100 percent levels, the total ramp transition (2T in FIG. 2) is exactly twice the 25 to 75 percent transition (T in FIG. 2). In FIG. 8, it is shown that the optimum matching occurs when the electrical length of the filter is equal to one-half the input 0 to the 100 percent ramp transition time. This is equal to T*ns* for this case.

Since the center region of a pulse transition will be the most linear, it is convenient to measure the 25 to 75 percent transition time and design the electrical length of the first stage equal to this value. If this is done, the output wave shape is constructed as shown in FIG. 9.

Note that the first and second terms from equation 1 are shown in the figure and are separated by 2T*ns*. The output signal is the summation of these terms and the following points are noted:

1. The output slope is one-half the input slope.
2. The output linear region is increased from the 25–75 percent points to the 12.5–87.5 percent points. (If another stage of integration is added the linear region would be extended to the 6.25–93.75 percent points.)
3. Optimum linearity results if the nonlinear curvature from the 0 percent to the 25 percent point of the input is exactly equal and opposite to the nonlinear curvature from the 75 percent to the 100 percent points. Also, the input signal should have little or no overshoot.

The following design steps summarize the practical design of a transmission line integrator:

1. Determine the desired output 10 to 90 percent rise time.
1. Multiply this number by 1.25 to obtain the 0 to 100 percent transition time.
3. The electrical length of the largest filter stage is one-fourth of this number.
4. The electrical length of the smallest filter stage is $1/2^{n+1}$ of this number (where $n$ is the number of integrator stages). This is also the transition time between the 25 to 75 percent points of the input signal.

These steps are reduced to numerical values in table 1 (or should it be table C,) to allow easier application.

TABLE C

Table for computing the electrical length of the first stage of a transmission line filter when the 10%–90% risetime of the output is given

| Number of filter stages | Multiply the 10%–90% risetime of the desired output by this number to obtain the electrical length of the first stage | If the input signal is linear from the 25%–75% then the output will be linear from percent): |
|---|---|---|
| 1 | 0.31250 | 12.5–87.5 |
| 2 | 0.15625 | 6.25–93.75 |
| 3 | $0.78125\times10^{-1}$ | 3.13–96.88 |
| 4 | $0.39063\times10^{-1}$ | 1.56–98.44 |
| 5 | $0.19531\times10^{-1}$ | 0.78–99.22 |
| 6 | $0.97655\times10^{-2}$ | 0.39–99.61 |

Note.—(1) This time is equal to the 25% to 75% of the input transition for optimum matching. (2) The electrical length of each succeeding stage is twice the length of the preceding stage.

Figure 10:
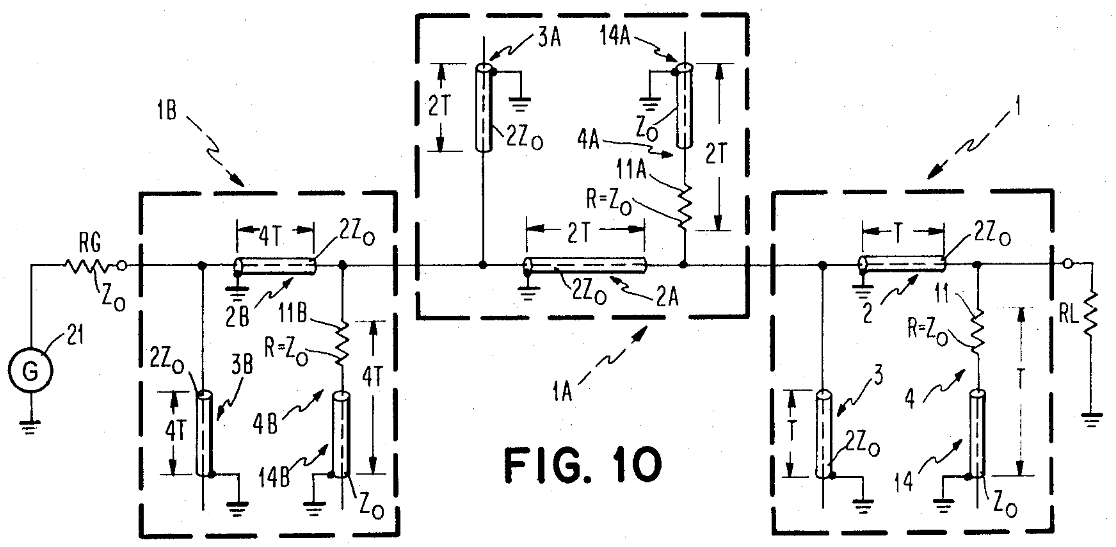
FIGS. 10 to 11A illustrate other pulse-shaping configuration utilizing the filters of this invention, together with the attendant waveforms thereof.
Figure 11:
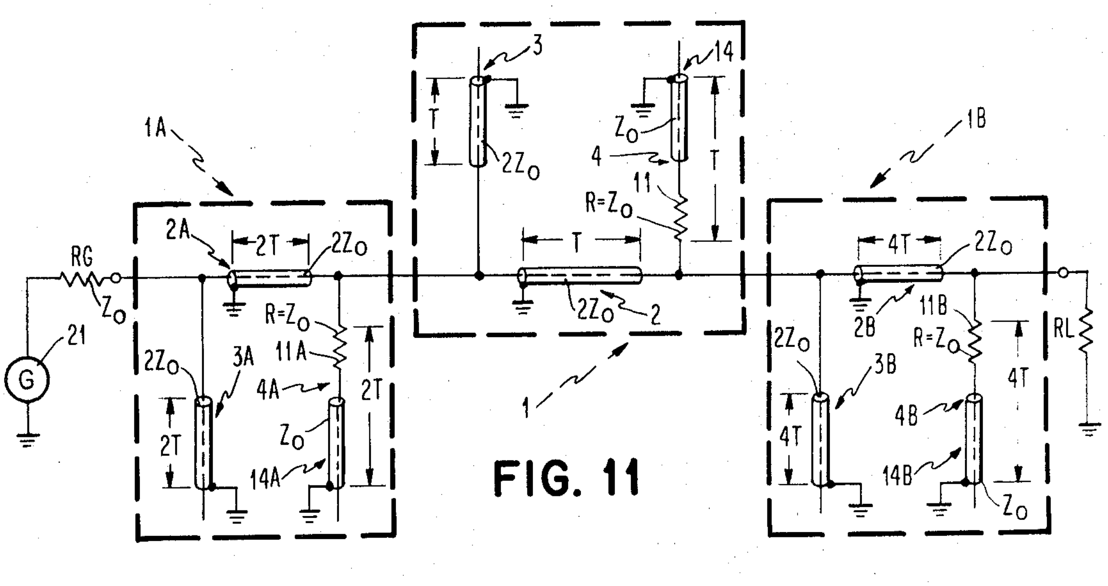
Figure 10A:
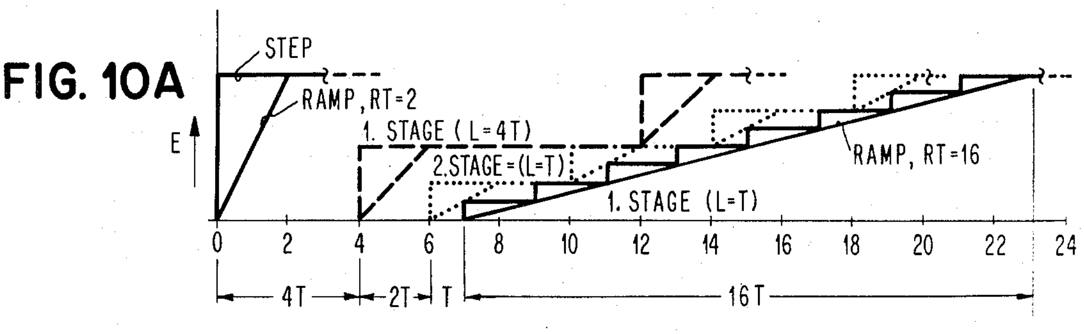
Figure 11A:
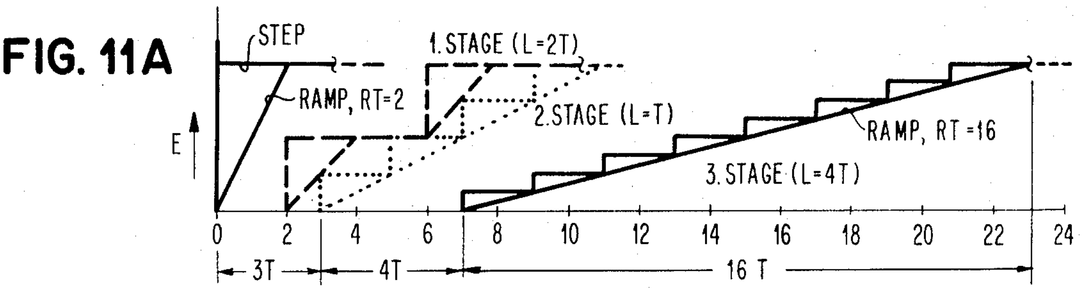

FIG. 10 and 11 illustrate the flexibility in intermixing filter stages of different time lengths wherein filter stages 1, 1A and 1B are identical in all respects to the same stages in FIG. 6. The response of each stage in the system of FIG. 10 to stepped and ramped inputs as shown in FIG. 10A; and the response of each stage in the system of FIG. 11 to like inputs is shown in FIG. 11A.

Figure 12:
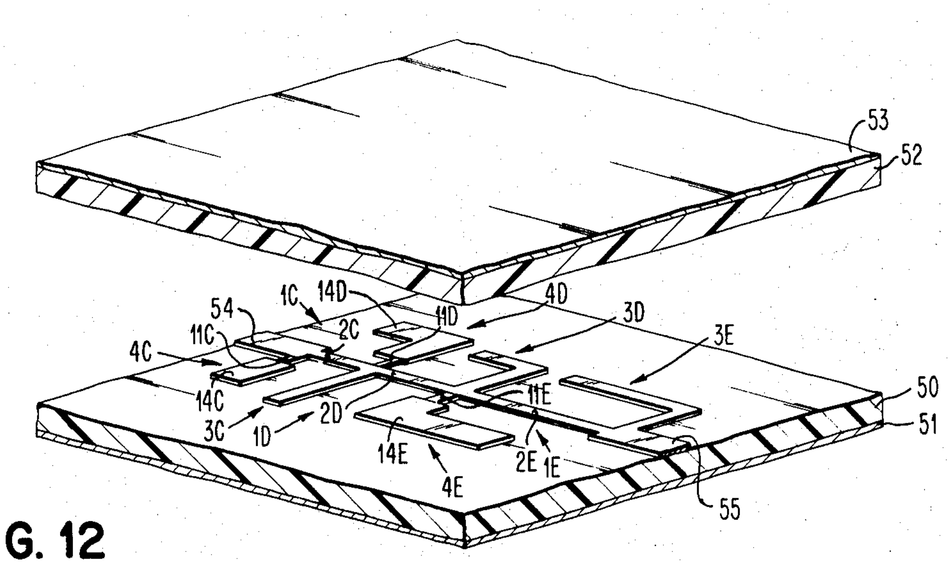
FIGS. 12 to 12B illustrate another embodiment of filter circuits in accordance with this invention together with attendant waveforms thereof.

The adaptability of the filter of this invention to implementation in strip transmission line structures is illustrated in FIG. 12. Specifically shown is a three-stage filter integrated in a 50-ohm strip line structure in which the first stage was designed to accept a 20 to 80 percent transition of 250 psec. with an output after the third stage of 2.0 nsec. which is linear in the 2.5 to 97.5 percent transition.

The strip line conductors are suitably bonded, deposited or etched on a dielectric sheet 50. In this specific embodiment the conductors were etched from a 0.0014-inch copper film bonded to a 0.062 dielectric board having a dielectric constant of 2.55. A board coated with copper of 0.05 resistivity etching conductor of this embodiment is commercially available as "Textolite 11711," 1-oz. copper clad. In use as a conductive ground plane 51 is bonded to the bottom side of sheet 50. A second sheet 52 of dielectric of like constant is shown positioned above sheet 50, a conductive ground plane 53 is bonded to the top side of sheet 52. In practice, the two sheets are superimposed and clamped together by cover plates or other conventional securing means. In this configuration the strip line conductors are sandwiched between dielectric sheets 50 and 52 in spaced relationship with the coextending ground planes 51 and 53 bonded to the outer surfaces of, respectively, sheets 50 and 51.

The three filter stages of this embodiment are generally indicated in FIG. 12 by the legends 1C, 10 and 1E. The main lines 2C, 2D and 2E, of the respective stages 1C, 10 and 1E, comprise corresponding sections of a continuous strip line filter line conductor extending in continuation between strip line terminal conductors 54 and 55. The overall length of this filter line conductor is 6.486 inches.

For this specific embodiment conductor defines an input terminal to the system, and conversely conductor 55 defines an output terminal from the system. Each of conductors 54 and 55 are 2 inches in length and of 0.090-inch thickness to define an input of 50-ohm impedance.

The main line 2C, of filter stage 1C, comprise a 0.936-inch-long portion of the overall filter strip line of 0.019-inch width to define an impedance of 100 ohms. The stage limit of both ends of the main line 2C are defined by connection thereto of terminating legs 3C and 4C. Terminating leg 3C comprises a 0.019-wide section of strip line having an overall length of 0.936 inch measured as a continuous from the main strip line. The other terminating leg comprises a resistor 11C connected in series with a section of a strip line 14C. The resistor 11C comprises a deposited thin film cermet resistor of 50 ohms connected at its free end to the strip main line 2C. The strip line section 14C is 0.090 inch wide and 0.741 inch long to define an impedance of 50 ohms, which in conjunction with the 50-ohm impedance of cermet resistor 11C forms a 100-ohm impedance for their terminating leg 4C. In accordance with the specified dimensions, the characteristic time length T of the main strip line 2C is 0.125 nsec. with a like characteristic time length T of 0.125 nsec. for each of terminating legs 3C and 4C. In sum, this also defines a characteristic time length T of 0.125 nsec. for the filter stage 1C.

In general, it is noted that the open-ended strip or transmission line section (e.g. 14C) connected to the terminating leg resistor (e.g. 11C) should be T nsec. minus the propagation time of this resistor. Normally, a 50-ohm ¼-watt resistor will have an electrical length of about 45 psec. (e.g. 0.045 nsec.), and a 50-ohm ⅛-watt resistor will have an electrical length of about 25 psec. (e.g. 0.025 nsec.). It is to be understood that each of strip line sections 3C and 14C are open ended.

Similarly the main line 2D, of filter stage 1D, comprises a 1.85-inch portion of the overall filter strip line of 0.019-inch width to define an impedance of 100 ohms and an electrical length 2T of (e.g. 2×0.125 nsec.) of 0.250 nsec. The stage limits of both ends of main line 2D are defined by connection thereto terminating legs 3D and 4D. Terminating leg 3D comprises a 0.019-inch-wide section of strip line having an overall length of 1.85 inches measured as a continuum from main line. These dimensions define a characteristic impedance and electrical length for terminating leg 3D of 100 ohms and 0.250 nsec. respectively.

The other terminating leg 4D comprises a 50-ohm cermet film resistor 11D connection in series with an open-ended section of strip line 14D. This strip line section 14D is 0.090 inch wide and 1.68 inches long to define an impedance of 50 ohms which in conjunction with the 50-ohm impedance of cermet resistor 11D form a 100-ohm impedance and an electrical length of 0.250 nsec. for their terminating leg 4D. Conversely the characteristic impedance and electrical length of filter stage 1D is 50 ohms and 0.250 nsec. respectively.

The third and final filter stage includes a main strip line 2E comprising a 3.70-inch portion of the overall filter strip line of 0.019 in. width to define an impedance of 100 ohms and an electrical length 4T (e.g. 4×0.125 nsec.) of 0.50 nsec. The stage limits of both ends of main line 2E are defined by connection thereto of terminating legs 3E and 4E. Terminating leg 3E comprises a 0.019 length of 3.70 inches measured as a continuum from the main line 2E. These dimensions define a characteristic impedance and time length for terminating leg 3E of 100 ohms and 0.50 nsec. respectively.

The other terminating leg 4E comprises a 50-ohm cermet film resistor 11E connected in series with an open-ended section of strip line 14E. This section of strip line 14E is 0.090 inch wide and 3.52 inches long to define an impedance of 50 ohms which in conjunction with the 50-ohm impedance of cermet resistor 11E forms a 100-ohm impedance and an electrical length of 0.50 nsec. for their terminating leg 4E. Conversely, the characteristic impedance and an electrical length of stage 1E is 50 ohms and 0.50 nsec; respectively.

Access to the input and output terminals 54 and 55 can be effected by any conventional connectors, as for example, the commercial units OSM 244–2 connectors available from Omni Spectra Corp. of Farmington, Michigan.

Figure 12A:
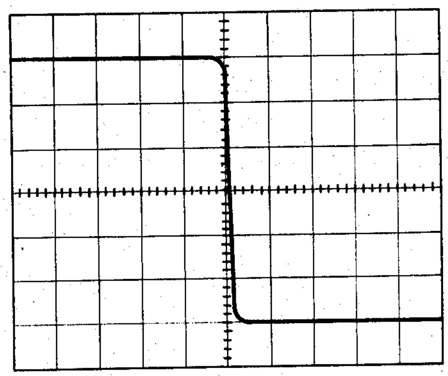
Figure 12B:
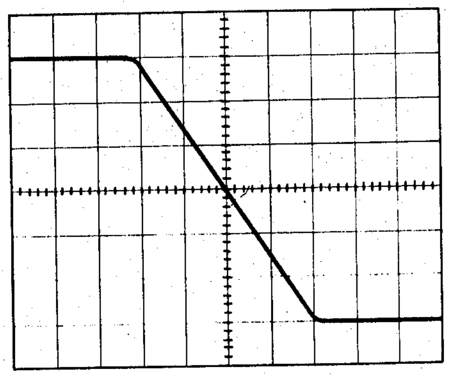

The output pulse leading transition in response to input transition rise time of 0.25 nsec. (20–80 percent) is shown in FIGS. 12A and 12B.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A filter circuit adapted for pulse shaping, with said circuit comprising equal first and second shield-grounded transmission lines of $2Z_0$ impedance and each having the time lengths T, with the first ends of the conductors of said lines connected in common to a first access terminal of said shaper, and wherein $Z_0$ represents a desired matching impedance of an external circuit connected to said access terminal, with said first line having the conductor thereof open circuited at the second end thereof, a resistor of said $Z_0$ impedance having one end connected to a free end of the said second line for electrical connection to a second access terminal of said shaper and a third shield-grounded transmission line of said $Z_0$ impedance having the conductor thereof open circuited at one end thereof and with the opposite end connected in series to the other end of said resistor, with said resistor together with said third transmission line having said time length T.

2. The pulse shaper of claim 1 wherein each of the said first, second and third transmission lines comprises a coaxial cable.

3. The pulse shaper of claim 1 wherein each of said first, second and third transmission lines comprises a strip transmission line.

4. The pulse shaper of claim 3 wherein said resistor comprises a thin film resistor.

5. The pulse shaper of claim 1 wherein each said first, second and third transmission lines comprise corresponding first, second and third conductive extensions disposed between superimposed upper and lower dielectrics, and an outer conductor on each of the exposed surfaces of each of said dielectrics defining a ground plane for each said conductive extensions.

6. The pulse shaper of claim 5 wherein said resistor comprises a thin film resistor disposed between said dielectrics.

7. A transmission line filter stage comprising three legs of equal electrical time lengths, with A. the first of said legs comprising a shield-grounded first transmission line of $2Z_0$ line impedance having the conductor thereof connected a. at one end to a first access terminus and b. at the opposite end to a second access terminus, wherein said $Z_o$ represents a matching impedance of an external circuit connected to said second access terminus B. the second of said legs comprising a second shield-grounded transmission line of said $2Z_o$ impedance having the conductor thereof open circuited at one end and with the other end connected to said opposite end of the conductor of said first transmission line, and C. the third of said legs comprising a. a resistor of said $Z_o$ impedance connected at one end to the said one end of the conductor of said first transmission line, and b. a third shield-grounded transmission line of said $Z_o$ impedance having the conductor thereof open circuited at one end and with the opposite end connected to the other end of said resistor.

8. The pulse shaper of claim 7 wherein each of said first, second and third transmission lines comprises a coaxial cable.

9. The pulse shaper of claim 7 wherein each of said first, second and third transmission comprises a strip transmission line.

10. The pulse shaper of claim 9 comprises said resistor comprises a thin film resistor.

11. The pulse shaper of claim 7 wherein each said first, second, and third transmission lines comprise corresponding first, second and third conductive extensions disposed between superimposed upper and lower dielectrics, and outer conductors on each of the exposed surfaces of each of said dielectrics defining a ground plane for each said conductive extensions.

12. The pulse shaper of claim 11 wherein said resistor comprises a thin film resistor disposed between said dielectrics.

13. A pulse shaper comprising at least two said filter stages of claim 7 connected in series at respective first and second access termini of adjacent stages wherein corresponding legs of said stages have different time lengths.

14. The pulse shaper of claim 13 wherein

A. the legs of a first of said filter stages have a time length equal to one-half the rise time of an input signal applied to one of said first and second termini; and B. the legs of a second of said filter stages have a time length equal to one-fourth a desired rise time of an output signal at the other of said first and second access termini.

15. The pulse shaper of claim 13 wherein each of said first, second and third transmission lines comprises a coaxial cable.

16. The pulse shaper of claim 13 wherein each of said first, second and third transmission comprises a strip transmission line.

17. The pulse shaper of claim 16 comprises said resistor comprises a thin film resistor.

18. The pulse shaper of claim 13 wherein each said first, second and third transmission lines comprise corresponding first, second and third conductive extensions disposed between superimposed upper and lower dielectrics, and outer conductors on each of the exposed surfaces of each of said dielectrics defining a ground plane for each said conductive extension.

19. The pulse shaper of claim 18 wherein said resistor comprises a thin film resistor disposed between said dielectrics.

20. A pulse-shaping system comprising at least two said filter stages of claim 7 connected in series at respective first and second access termini of adjacent stages wherein the said legs of a first of said stages have an equal time length therein with said time length at least a multiple greater than the equal time length of each corresponding leg of a second of said stage.

21. The pulse shaper of claim 20 wherein each of said first, second and third transmission lines comprises a coaxial cable.

22. The pulse shaper of claim 20 wherein each of said first, second and third transmission comprises a strip transmission line.

23. The pulse shaper of claim 22 comprises said resistor comprises a this film resistor.

24. The pulse shaper of claim 20 wherein each said first, second and third transmission lines comprise corresponding first, second and third conductive extensions disposed between superimposed upper and lower dielectrics, and outer conductor on each of the exposed surfaces of each of said dielectrics defining a ground plane for each said conductive extension.

25. The pulse shaper of claim 24 wherein said resistor comprises a thin film resistor disposed between said dielectrics.

26. The pulse shaper of claim 20 wherein

A. the legs of a first of said filter stages have a time length equal to one-half the rise time of an input signal applied to one of said first and second termini; and B. the legs of a second of said filter stages have a time length equal to one-fourth a desired rise time of an output signal at the other of said first and second access termini.

* * * * *